(12) United States Patent
Jo et al.

(10) Patent No.: US 7,336,243 B2
(45) Date of Patent: Feb. 26, 2008

(54) RADIO FREQUENCY IDENTIFICATION TAG

(75) Inventors: Young-Min Jo, Rockledge, FL (US); Frank M. Caimi, Vero Beach, FL (US); John Charles Farrar, Indialantic, FL (US); Paul A. Tornatta, Jr., Melbourne, FL (US)

(73) Assignee: Sky Cross, Inc., Melbourne, FL (US)

( * ) Notice: Subject to any disclaimer, the term of this patent is extended or adjusted under 35 U.S.C. 154(b) by 420 days.

(21) Appl. No.: 10/856,354

(22) Filed: May 28, 2004

(65) Prior Publication Data

US 2005/0024287 A1 Feb. 3, 2005

Related U.S. Application Data

(60) Provisional application No. 60/474,128, filed on May 29, 2003, provisional application No. 60/503,820, filed on Sep. 17, 2003.

(51) Int. Cl.
*H01Q 1/36* (2006.01)

(52) U.S. Cl. ............... 343/895; 343/700 MS; 340/572.7

(58) Field of Classification Search ......... 343/700 MS, 343/895, 767, 770; 340/572.1, 572.7
See application file for complete search history.

(56) References Cited

U.S. PATENT DOCUMENTS

| | | | |
|---|---|---|---|
| 3,736,534 A | 5/1973 | Chaffee | |
| 3,742,393 A | 6/1973 | Karp | |
| 3,754,197 A | 8/1973 | Cristal | |
| 4,142,674 A | 3/1979 | Walton | |
| 4,293,858 A | 10/1981 | Hockham | |
| 4,435,689 A | 3/1984 | McDowell | |
| 4,583,099 A * | 4/1986 | Reilly et al. | 343/895 |
| 4,786,914 A | 11/1988 | Wu et al. | |
| 5,030,940 A | 7/1991 | Siikarla | |
| 5,528,222 A | 6/1996 | Moskowitz et al. | |
| 5,682,143 A | 10/1997 | Brady et al. | |
| 5,719,586 A | 2/1998 | Tuttle | |
| 5,754,143 A | 5/1998 | Warnagiris et al. | |
| 5,867,126 A * | 2/1999 | Kawahata et al. | 343/702 |
| 5,892,490 A | 4/1999 | Asakura et al. | |
| 5,936,587 A | 8/1999 | Gudilev et al. | |
| 5,972,156 A | 10/1999 | Brady et al. | |
| 5,995,006 A | 11/1999 | Walsh | |
| 6,028,564 A | 2/2000 | Duan et al. | |
| 6,028,567 A | 2/2000 | Lahti | |
| 6,040,803 A | 3/2000 | Spall | |

(Continued)

FOREIGN PATENT DOCUMENTS

| EP | 0 472 932 A1 | 3/1992 |
|---|---|---|
| WO | WO 99/29525 | 6/1999 |

(Continued)

*Primary Examiner*—Tan Ho
(74) *Attorney, Agent, or Firm*—John DeAngelis; Busse Wolter Sanks Mora & Maire, P.A.

(57) ABSTRACT

A radio frequency identification tag attached to an object and comprising an antenna and an integrated circuit for providing object information to a separate reader. The antenna further comprises a pair of meanderline transmission lines each terminated at a first end for conductive connection to the integrated circuit. A shorting bar connected between the pair of meanderline transmission lines at the first ends is operative to match an antenna impedance with an integrated circuit impedance.

30 Claims, 3 Drawing Sheets

U.S. PATENT DOCUMENTS

| | | |
|---|---|---|
| 6,049,461 A * | 4/2000 | Haghiri-Tehrani et al. .. 361/737 |
| 6,094,170 A | 7/2000 | Peng |
| 6,097,347 A | 8/2000 | Duan et al. |
| 6,107,920 A | 8/2000 | Eberhardt et al. |
| 6,124,831 A | 9/2000 | Rutkowski et al. |
| 6,147,662 A | 11/2000 | Grabau et al. |
| 6,166,694 A | 12/2000 | Ying |
| 6,218,992 B1 | 4/2001 | Sadler et al. |
| 6,249,227 B1 | 6/2001 | Brady et al. |
| 6,259,408 B1 | 7/2001 | Brady et al. |
| 6,271,793 B1 | 8/2001 | Brady et al. |
| 6,285,342 B1 * | 9/2001 | Brady et al. ................ 343/895 |
| 6,320,509 B1 | 11/2001 | Brady et al. |
| 6,329,915 B1 | 12/2001 | Brady et al. |
| 6,388,626 B1 | 5/2002 | Gamalielsson et al. |
| 6,390,375 B2 | 5/2002 | Kayanakis |
| 6,400,323 B2 * | 6/2002 | Yasukawa et al. ... 343/700 MS |
| 6,404,391 B1 | 6/2002 | Apostolos |
| 6,535,175 B2 | 3/2003 | Brady et al. |
| 6,624,795 B2 * | 9/2003 | Boyle ........................ 343/895 |
| 6,642,893 B1 * | 11/2003 | Hebron et al. .............. 343/702 |
| 2002/0149521 A1 | 10/2002 | Hendler et al. |
| 2003/0132893 A1 | 7/2003 | Forster et al. |

FOREIGN PATENT DOCUMENTS

| | | |
|---|---|---|
| WO | WO 03/003874 A2 | 5/2003 |
| WO | WO 2004/038853 A2 | 5/2004 |

* cited by examiner

RADIO FREQUENCY IDENTIFICATION TAG

This patent application claims the benefit of the provisional patent application filed on May 29, 2003, which has been assigned Application No. 60/474,128, and the provisional patent application filed on Sep. 17, 2003, which has been assigned Application No. 60/503,820.

FIELD OF THE INVENTION

The present invention relates generally to radio frequency identification tags and identification systems employing such tags, and more specifically to antennas for use in radio frequency identification tags.

BACKGROUND OF THE INVENTION

Radio frequency identification (RFID) is a rapidly growing segment of today's automatic identification and data collection industry. RFID technology is considered a complement and likely an eventual replacement for bar code technology as RFID technology overcomes certain recognized bar code limitations. In particular, a visual line of sight is not required between a reader and a tagged RFID object, as RFID technology is not optically based. In a read mode, an RFID tag wirelessly receives data from a reader or interrogator to update or change data stored in the tag. In a write mode, the tag wirelessly transmits data to supply information stored in the tag to the reader.

RFID tags (also referred to as transducers) enjoy a wide variety of applications, including automatic fair collection on bridges, toll roads, and public transit vehicles; wireless pay-at-the-pump payment systems, hands-free access control security systems and identification and location of an object to which the tag is affixed. The tags provide a quick, flexible and reliable wireless system to detect, identify, track and therefore manage many different items. For example, supply chain logistics is expected to be the largest and fastest growing application for RFID tags that can operate over distances of about 20 feet. Affixing a tag to cases, cartons and pallets permits efficient identification of the contents of mixed pallets during material handling operations, such as truck loading or unloading. Incoming pallets at shipping and receiving facilities can be automatically routed to the proper destination by reading the RFID tags. In a warehouse environment, workers can scan storage areas using an RFID reader that automatically detects the item and its stored location.

RFID tags can be read through packaging, shipping containers, and most materials except metal. By interrogating a tag affixed to an object, including retail articles, materials, containers and enclosures, the object's location can be determined. For example, an RFID tag affixed to retail merchandise causes a reader to sound an alarm if a shopper attempts to exit the establishment without paying for the item.

Generally, an RFID tag comprises an integrated circuit in conductive communication with an antenna printed or etched on a dielectric substrate. RFID tags operate either passively (i.e., without an internal battery) or actively (i.e., powered by a separate battery). Information is stored in the integrated circuit and transmitted by the antenna over a radio frequency communications link to the external reader. Information is received over the link from the reader, for storage in or processing by the integrated circuit. Other tag embodiments only respond to interrogation signals from the reader. The response is typically digital, i.e., a one or a zero is transmitted as the response (where each response type is referred to as a modulation state). For certain embodiments, the lack of a response is interpreted as a zero response. Ones and zeroes can be transmitted by spoiling the impedance match between the integrated circuit and the tag antenna. In one state the antenna is shorted and in the other state the antenna load comprises the impedance of an active integrated circuit. Alternatively, an active type tag can switch a lossy element into the circuit as one of the two reply states for the reader to sense. A passive tag does not include a conventional transmitter, but instead comprises only a switched lossy element that generates the two states. However, in the description herein the tags are referred to as comprising generic receiving/transmitting elements, recognizing that the conventional mechanisms for receiving and transmitting radio frequency signals may not be employed. Tags vary in size as necessitated by the application, the operating frequency of the radio communications link and the processing and data storage capabilities of the integrated circuit. Information transmission speed and signal range depend on many factors, including operating frequency of the communications link, antenna size, tag output power, and signal noise and interference that affects the signal quality in both the transmitting and receiving modes.

Information is sent to and read from the RFID tag over the radio frequency communications link. In passive systems, which are the most common, an RFID reader transmits a radio frequency signal that "wakes up" the tag and provides power to the integrated circuit, enabling it to transmit data to the reader or store received data. An active system employs a separate battery to boost the effective operational range of the tag. Active tags may also periodically transmit a signal, without prompting, so that data may be captured by one or more readers located proximate the tag. For example, a plurality of fixed readers in a warehouse periodically receive tag signals for use in determining the tag location and thus the location of the product to which the tag is attached. The data received by the reader is typically sent from the reader to a host computer or processing system via a network interface. In certain applications, an encryption algorithm encrypts the information signal to ensure security and integrity of the data sent between the tag and the reader.

The reader may be integrated into a permanently-fixed reading station or disposed in a hand-held terminal. The fixed station is positioned at strategic points, such as a facility entrance/exit, dock door, or an assembly line.

A plethora of RFID tag technologies and specific tag designs are known. The application determines the appropriate tag technology, including operating frequency, system performance and tag memory capacity. Performance of passive RFID tags is determined primarily by the tag operating frequency. Low frequency RFID systems operate at about 1-5 kHz with a typical maximum read range of up to about 20 inches. High frequency systems operate at about 13.56 MHz with a typical maximum read range of up to about three feet. Ultra-high frequency RFID tags operate at multiple frequencies including 915 MHz and 2.45 GHz with a read range of up to about 20 feet.

The lower frequency tags are moderately resistant to shielding but exhibit limited functionality due to signal bandwidth constraints. In particular, systems based on these tags generally operate reliably only when a single tag is in an interrogation zone at any given time. Tags operating at these lower frequencies also tend to be relatively bulky and expensive to manufacture.

At the higher frequencies (13.56 MHz and above), the additional available bandwidth (up to about 30-40 MHz)

allows the system to reliably and simultaneously process multiple tags in the interrogation zone. This feature is highly desirable for many tag applications.

The tag antenna geometry and radiating properties depend on the tag operating frequency. For example, RFID tags operable at about 2.45 GHz typically comprise a dipole antenna or a folded dipole antenna. At about 13.56 MHz, the RFID tag antenna preferably comprises a spiral antenna, a coil antenna or an inductively loaded dipole.

Irrespective of the specific antenna geometry and characteristics, the antenna receives an information signal from a tag interrogation source or reader. This signal commands the tag to perform one or more functions, including transmitting a reply signal to the reader, while also supplying energy to power the tag's integrated circuit. For optimal performance, the antenna characteristics must be matched to the tag integrated circuit and to the interrogation device.

For tags operating in the high MHz to GHz range, the most important antenna characteristic is antenna length. In most applications, the effective electrical length of the dipole antenna is a half wavelength or a multiple of a half wavelength of the information signal frequency. For tags operating in the low to mid MHz region where a half wavelength antenna is impractical due to tag size limitations, the important antenna characteristics include antenna inductance and the number of turns in the antenna coil.

All antenna geometries require good electrical conductivity. Typically, metals such as copper or aluminum are used, but other conductors, including magnetic metals such as permalloy, are also acceptable and are, in fact, preferred for some applications.

It is known that maximum energy is transferred between the integrated circuit and the antenna when the integrated circuit input impedance substantially matches the antenna impedance. In certain embodiments, the tag includes a tuning capacitor to provide the impedance match. The capacitor comprises a discrete component or an element of the antenna, i.e., the capacitor is integrated into the antenna structure. The capacitance value is selected so that when considered with the antenna inductance, the resonant frequency of the composite circuit, given by $f_{res}=1/(2^*\pi (LC)^{1/2})$, where C=capacitance (in Farads) and L=inductance (in Henries) closely matches the desired operating frequency of the RFID tag system. Those skilled in the art recognize that an exact impedance match is seldom attainable and is not required, but the energy transfer improves as the impedances are more closely matched. Generally, an impedance match in the range of 10-20% is acceptable. In another embodiment, the capacitor comprises a distributed capacitor, which may be desired to reduce tag size, particularly tag thickness, and to minimize manual assembly efforts. In some tag designs, particularly tags operating at very high frequencies, such as 2.45 GHz, a tuning capacitor may not required.

It is known that performance of the tag antenna, and thus performance of the tag, depends on the electrical properties of the item to which the tag is attached, as electrical properties of both the item enclosure and its contents may affect tag performance. In particular, the dielectric constant of the enclosure material (e.g., cardboard, plastic, paper) and/or the contents can shift the antenna resonant frequency, degrading tag performance due to attenuation of the received or transmitted signal. Since the type of material to which the tag will be affixed is generally not known during tag design and development, the tag is typically designed and tested for free space operation. Later application of the tag to an item may cause the above-mentioned resonant frequency shift.

Empirical testing of a tag affixed to various types of material reveal that for most materials the antenna resonant frequency shifts downwardly from its free space value. To overcome the frequency shift it is possible, although costly and complex, to design and fabricate a unique antenna, and thus a unique tag, for each type of material. However, this solution requires production and inventory tracking of various tag models, each including an antenna optimized for operation with a specific material type.

BRIEF SUMMARY OF THE INVENTION

In one embodiment, the present invention comprises a radio frequency transponder comprising a substrate and an integrated circuit disposed on the substrate. An antenna is further disposed on the substrate and coupled to the integrated circuit. The antenna has a physical length and an electrical length greater than the physical length and exhibits an antenna input impedance. An impedance transformation element connected to the antenna substantially matches the integrated circuit impedance to an antenna input impedance.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasizing instead the principles of the invention.

DETAILED DESCRIPTION OF THE INVENTION

Before describing in detail the particular apparatus related to an antenna and an RFID tag, it should be observed that the present invention resides primarily in a novel and non-obvious combination of elements. So as not to obscure the disclosure with details that will be readily apparent to those skilled in the art, certain conventional elements and steps are presented with lesser detail, while the drawings and the specification describe in greater detail other elements pertinent to understanding the invention.

Figure 1:
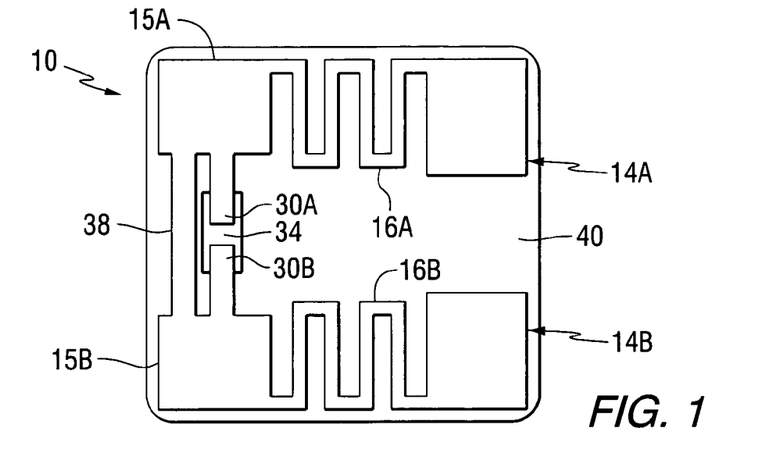
FIG. 1 illustrates an RFID tag constructed according to the teachings of the present invention.

FIG. 1 illustrates a tag 10 comprising an antenna structure constructed according to the teachings of the present invention. The antenna comprises pads 14A, 14B, 15A and 15B with a meanderline 16A disposed between the pads 14A and 15A, and a meanderline 16B disposed between the pads 14B and 15B. Each of the meanderlines 16A and 16B compensate the desired antenna electrical length to achieve a resonant condition, i.e., where the desired electrical length is a multiple of a half wavelength or quarter wavelength at the operating frequency. Various embodiments include or exclude the pads 14A/14B and 15A/15B as warranted by operating parameters of the tag components and the desired performance characteristics of the tag.

A pad 30A extends inwardly in a direction toward a centerline of the tag 10 from the pad 15A; a pad 30B extends inwardly from the pad 15B. An integrated circuit 34 comprises first and second terminals (not specifically depicted in FIG. 1) for connection to the pads 30A and 30B, respectively.

In one embodiment as illustrated in FIG. 1, the meanderlines 16A and 16B comprise two spaced-apart substantially parallel legs forming a U-shaped structure. By comparison, a conventional dipole comprises two oppositely directed legs. Since in one embodiment of the present invention a distance between the parallel legs is approximately equal to a length of each leg, a tag constructed according to that embodiment presents an approximately equal length and width dimension, which may be an advantageous configuration for use with certain items to be tracked or interrogated. However, the tag of the present invention is not limited to this configuration.

The tag exhibits performance equivalent to prior art tags that are much larger, and the apparent radar cross-section or effective antenna aperture is not significantly impacted by the reduced tag size. As is known, a tag having a larger effective aperture or radar cross-section would exhibit improved performance in that the RF signal transmitted from the tag to the reader has a larger amplitude.

It is desired that the tag 10 optimally perform two functions. The tag 10 should efficiently convert the incoming radio frequency energy to direct current power capable of energizing the circuits in the integrated circuits 34. The tag 10 should also present a relatively high amplitude return signal to the reader under one modulation state and a minimum signal to the reader for another modulation state.

The tag 10 further comprises a shorting loop 38 (an inductive loop that includes a path through the integrated circuit) electrically connecting the pads 15A and 15B and forming an inductive loop with the integrated circuit 34 and the pads 30A and 30B. The shorting loop inductance interacts with a capacitance of the integrated circuit 34 to provide proper impedance matching between the antenna and the integrated circuit 34 (i.e., the impedance "seen" by the integrated circuit 34 at the pads 30A and 30B at the tag resonant frequency). Thus the shorting loop parameters (e.g., length and width) are selected to substantially match the impedance of the integrated circuit 34 to the impedance of the radiating structures, including the pads 15A and 15B, the meanderlines 16A and 16B and the pads 14A and 14B. The shorting loop further acts to reduce the effects of static discharges on the integrated circuit 34 by providing a current path around the integrated circuit 34. In another embodiment, impedance matching components can be included within the integrated circuit 34 to supplement or supplant the impedance matching properties of the shorting loop 38.

In a preferred embodiment, the various electrically conductive elements of the tag 10 as illustrated in FIG. 1 are disposed on a dielectric substrate 40. The substrate 40 comprises a polyester, polyurethane, polyimide plastic material with a conductive layer disposed thereon. Known subtractive etching processes are employed to remove conductive material regions to form the various conductive structures illustrated in FIG. 1. In another embodiment, a printing process employing conductive ink (e.g., such as an ink containing conductive silver particles) applies or prints the conductive structures of FIG. 1 on the dielectric substrate 40.

In an embodiment in which the substrate 40 comprises flexible material, the tag 10 can be applied to a non-planar surface such as a curved surface of a bottle. In another embodiment, the substrate 40 comprises rigid conventional printed circuit board material such as FR-4. In yet another embodiment, the substrate 40 further comprises an adhesive material affixed to a back surface thereof for attaching the tag 10 to an item or object.

Generally, the integrated circuit 34 comprises transmitting, receiving and memory devices for communicating with a reader or interrogation devices as is well known in the RFID tag art. Although the element 34 preferentially comprises an integrated circuit, the present invention includes other elements capable of transmitting or receiving signals and storing information.

The meanderlines 16A and 16B operate as slow wave structures such that a desired electrical length (in one embodiment, a quarter wavelength for each leg) can be achieved in a shorter physical length than a conventional antenna. That is, the slow wave structure exhibits an electrical length that is greater than its physical length. Thus the meanderlines 16A and 16B provide the electrical length to achieve antenna resonance at the tag operating frequency. In an embodiment operative at a resonant frequency of about 915 MHz, the tag size is about 1.5 inches square. By comparison, a half wavelength at 900 MHz is about six inches. Although illustrated as rectangular wavelike structures in FIG. 1, the meanderlines 16A and 16B can also comprise serpentine, sinusoidal, triangular, clipped rectangular or square wavelike structures, or any other slow wave structure. Generally, the meanderlines 16A and 16B comprise a plurality of undulating segments. Also, the number of segments in the meanderlines 16A and 16B can also be modified to achieve the desired tag performance.

In another embodiment, the pads 15A and 15B are disposed along the meanderlines 16A and 16B, rather than at an end thereof, and the integrated circuit 34 is electrically connected to the relocated pads 15A and 15B. In yet another embodiment, the pads 14A, 14B, 15A and 15B are disposed as shown in FIG. 1, and the integrated circuit 34 is electrically connected to the meanderlines 16A and 16B at a position between the pads 14A/15A and 14B/15B. Relocating the integrated circuit 34 according to these embodiments may improve the impedance match between the antenna structures and the integrated circuit 34. In yet another embodiment, either or both of the pad pairs 14A/14b and 15A/15B are not included within the tag structure.

Figure 2:
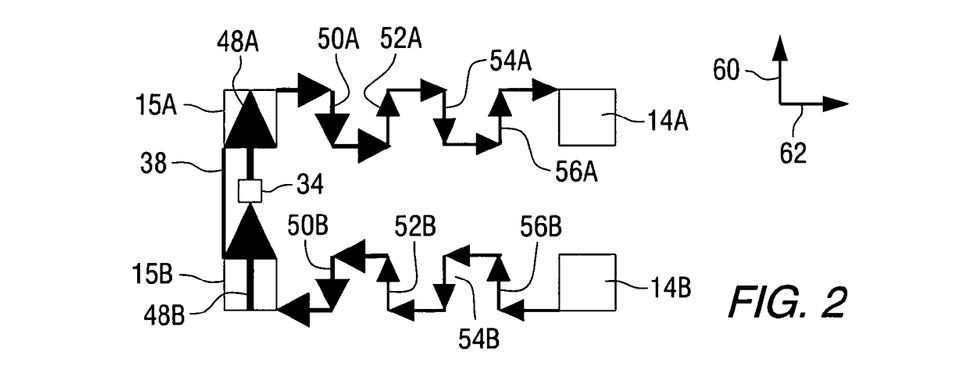
FIG. 2 schematically illustrates current flow paths within an antenna of the RFID tag of FIG. 1.

Current flow through the meanderlines 16A and 16B is additive in certain segments, thus increasing the radiated signal gain. FIG. 2 schematically illustrates current flow through the meanderlines 16A and 16B. As can be seen, current flow is in the same direction through segments 48A/48B, 50A/50B, 52A/52B, 54A/54B and 56A/56B. The current flow directions determine signal polarization. Vertical currents (i.e., depicted as flowing vertically in FIG. 2), produce a polarized signal in a direction indicated generally by an arrowhead 60. Horizontal currents (i.e., depicted as flowing horizontally in FIG. 2), produce a polarized signal in a direction indicated generally by an arrowhead 62.

The largest current flow is within the pads 15A/15B, as represented by large arrowheads in FIG. 2. Current flow through the meanderlines 16A and 16B is generally lower than current flow through the pads 15A/15B. The meanderlines 16A and 16B tend to be thinner conductive structures than the pads 15A/15B and therefore exhibit a higher loss due to $I^2R$ heating than the pads 15A/15B, but since these losses are confined to lower current regions of the structure their effect on the overall power losses (i.e., $I^2R$ losses) of the tag 10 are minimized.

Generally, the magnitude of current flow in the pads 14A and 14B is relatively low compared to the current magnitude in the other conductive structures of the tag 10. See FIG. 2. As is known, a low current (peak or average) in a conductive region of an antenna contributes less to the far field intensity radiation than a conductive region carrying a larger current. However, in conventional radar cross-section theory a relatively large conductive region with sharp edges can increase the virtual electrical size of the structure. Thus in one embodiment the pads 14A and 14B have substantially right angle edges to maximize a virtual aperture of the antenna and improve operation of the tag 10.

Figure 3:
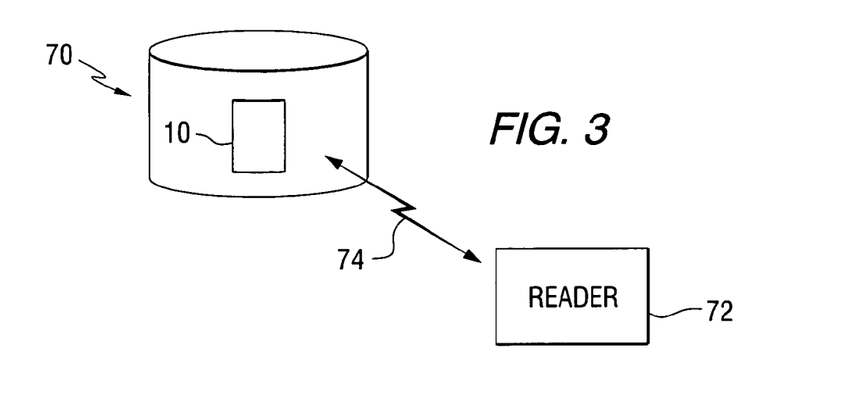
FIG. 3 illustrates an item having an RFID tag affixed thereto.

FIG. 3 illustrates the tag 10 affixed to a product 70 for communication with a reader 72 over a communications link 74. Since the tag 10 presents a smaller size than prior art tags, the tag 10 can be affixed to smaller items than prior art tags, without tag components protruding beyond the boundaries of the item. For example, for operation at about 915 MHz, a prior art tag (comprising a dipole or loop antenna is about 6 inches in a maximum direction) discouraging the application of such tags to small items, such as food or drink containers and small boxes. The tag of the present invention is about 1.5 inches square at 915 MHz for convenient application to small containers.

Figures 4A, 4B:
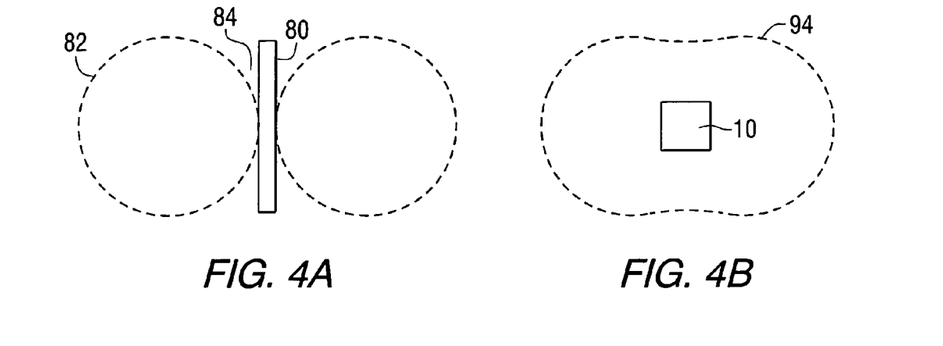
FIGS. 4A and 4B depict antenna radiation patterns.

It is known that the conventional dipole antenna oriented in a vertical direction exhibits a radiation pattern including a vertical radiation null. See FIG. 4A depicting a dipole antenna 80 and a radiation pattern 82 having a null region 84. Thus, a prior art tag including a dipole antenna exhibits a radiation null with the orientation of the null dependent on the orientation of the antenna within the tag and the orientation of the tag on the tracked item. In any case, the exist certain relative orientation of the tag and the reader where the communications signal appears within the null of the tag antenna, reducing the received signal intensity at the tag and reducing the transmitted signal intensity from the tag. As a result, the signal intensity may be below a usable threshold.

An antenna constructed according to the teachings of the present invention presents a more uniform isotropic pattern, such as a pattern 94 illustrated in FIG. 4B, than the prior art dipole antenna. The radiation pattern of the antenna of the present invention improves performance of the tag/reader communications link 74 as the orientation of the tag antenna with respect to the reader is not degraded by radiation pattern nulls.

In one embodiment, a bonding material for attaching the integrated circuit 34 to the pads 30A and 30B comprises a conductive adhesive, for example an adhesive having sufficient gold particle loading to create a relatively low resistance connection between terminals of the integrated circuit 34 and the pads 30A/30B. Other attachment techniques are known, including soldering according to a reflow or a wave soldering process.

In one embodiment, the integrated circuit 34 comprises a chip carrier enclosing an integrated circuit die or chip comprising the operative tag circuits, e.g., a transmitter, a receiver, storage elements and a controller. Typically, conductive terminals on the die are electrically connected to conductive terminals on the chip carrier, which are in turn connected to the pads 30A/30B. In another embodiment, the die terminals are connected directly to the pads 30A/30B without the use of the chip carrier. However, use of the chip carrier may simplify the manufacturing process as the carrier pads are larger than the chip pads. Application of mechanical pressure and heat to the integrated circuit 34 during the attachment process improves bond quality between the integrated circuit 34 and the pads 30A/30B.

The shorting bar 38, disposed in parallel with the integrated circuit 34, transforms the integrated circuit impedance to match the antenna impedance. That is, the real component of the chip impedance is substantially equal to the real component of the antenna terminal impedance, i.e., the antenna terminals as seen from the chip 34. The reactive component of the chip impedance is opposite in sign and substantially equal to the reactive component of the antenna terminal impedance at the preferred operating or resonant frequency. The shorting bar 38 and the integrated circuit 34 operate as a resonant circuit where the bar inductance cancels capacitive reactance appearing at the integrated circuit terminals to provide the aforementioned relationship of the antenna and integrated circuit reactive components.

Figure 5:
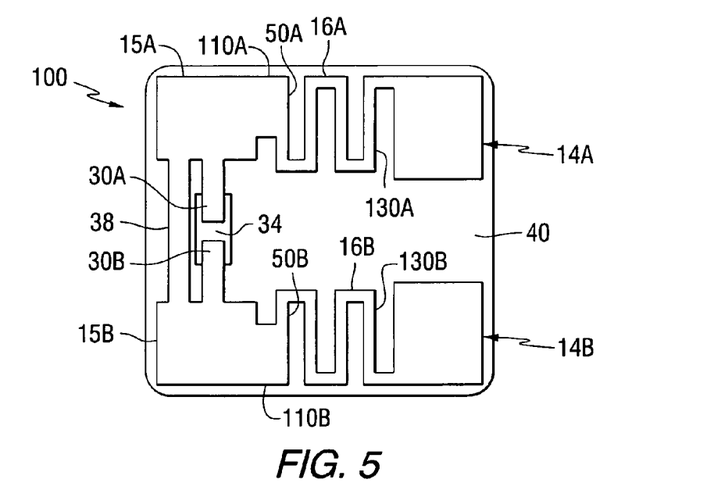
FIG. 5 illustrates a second embodiment of an RFID tag constructed according to the teachings of the present invention.

In another embodiment of the present invention, it is deemed advantageous for the antenna to further comprise a frequency tuning element to overcome a resonant frequency shift caused by operation of the tag proximate a material that alters the performance parameters of the tag antenna, in particular, shifts the antenna resonant frequency. As illustrated in FIG. 5, an RFID tag 100 further comprises at least two conductive tuning regions 110A and 110B contiguously disposed between the meanderline segments 50A and 50B and the pads 15A and 15B, respectively.

Figure 6A:
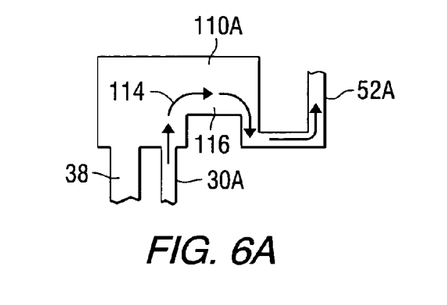
FIGS. 6A and 6B schematically illustrate partial current flow paths within an antenna of the RFID tag of FIG. 5.
Figure 6B:
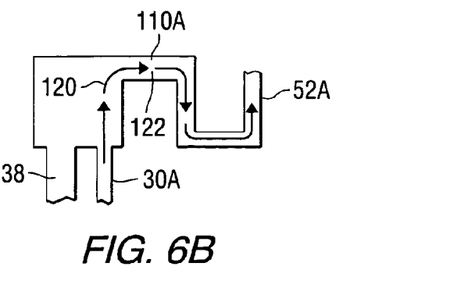

The tuning regions 110A and 110B alter the current flow path, specifically the path length, and thus the resonant frequency of the antenna. The path length is shortened by extending an area of the tuning regions 110A and 110B, i.e., extending the conductive material of the tuning regions 10A and 110B in a direction toward a centerline of the tag 100. See a current flow path 114 of FIG. 6A, wherein the path includes a region 116 of the tuning region 110A. In the absence of the tuning region 110A, the current path 120 (see FIG. 6B) includes a region 122 of the meanderline 16A and is thus longer than the current path 116 of FIG. 6A. A shorter current flow path results in upward shift in the resonant frequency.

By reducing the area of the tuning regions 110A and 110B, a tag antenna as illustrated in FIG. 5 can be tuned to exhibit a desired resonant frequency when the antenna is affixed to a specific object. The tuning can be accomplished experimentally by attaching a tag to the object and determining the resonant frequency shift attributable to the electrical properties of the object. The area of the tuning regions 110A and 110B is modified (reduced or increased in area in response to the observed frequency shift) to overcome the effects of the frequency shift. In one embodiment, laser energy directed at the tuning regions 110A and 110B reduces the conductive area by vaporizing a predetermined amount of the conductive material. Alternatively, the tuning regions can be mechanically reduced by cutting and removing conductive material to form a current path of the desired length. In another embodiment, the tuning regions can be reduced by forming a hole in the conductive material. In these exemplary embodiments, removal of conductive material shortens the current path and changes the antenna resonant length to increase the resonant frequency.

Although the tuning regions 110A and 110B are illustrated in FIG. 5 as disposed between the pads 15A/15B and the meanderline segments 50A and 50B, in other embodiments the tuning regions can be located between successive segments or between the meanderline segments 130A and 130B (see FIG. 5) and the pads 14A and 14B. However, it is generally considered more desirable to locate the tuning regions 110A and 110B as illustrated in FIG. 5, as this area of the antenna tends to produce most of the radiated energy from the antenna. It is generally known that placement of the tuning sections of an antenna influences the overall antenna efficiency.

In another embodiment, the tuning regions 110A and 110B are not equal in area (or one of the tuning regions is absent). As a result, the antenna may present a broader resonance due to unequal electrical lengths of the meanderlines 16A and 16B.

Figure 7:
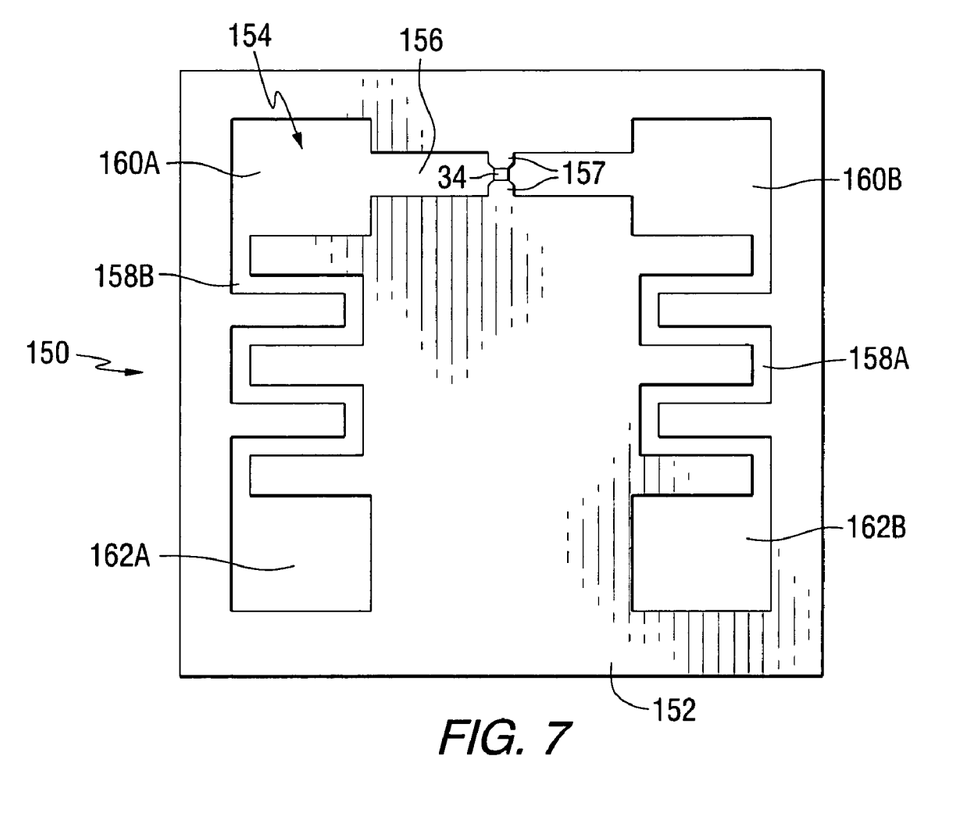
FIG. 7 illustrates an RFID tag constructed according to another embodiment of the present invention.

In yet another embodiment illustrated in FIG. 7, a tag 150 comprises a conductive material 152 having a slot antenna 154 formed therein, where the slot antenna comprises shaped openings in the material 152. The integrated circuit 34 is disposed across a bridging slot opening 156 and electrically connected to pads 157 extending from the material 152 in a direction toward the opening 156. The slot antenna 154 further comprises meanderline slots 158A and 158B, and pad slots 160A/160B and 162A/162B disposed at terminal ends of the meanderline slots 158A and 158B as illustrated. In a preferred embodiment, an impedance matching element is not required as a natural impedance of the slot antenna 154 closely matches the integrated circuit impedance. In another embodiment, an impedance matching element can be included.

The tag 150 can be formed by etching or stamping the various slot structures from a conductive sheet. Alternatively, the tag 150 can be formed by printing conductive ink on a substrate, such as polyester, polyimide, paper or polyurethane. Preferably, the tag 150 is formed from flexible material for ease in applying the tag 150 to an object, but flexibility is not a required characteristic. In a preferred embodiment operative at about 902-928 MHz, the tag 150 measures about 41 mm square. The tag 150 is scalable to other operational frequencies by modifying the dimensions of the tag and its components.

An architecture and process have been described as useful for an antenna for a RFID tag. Specific applications and exemplary embodiments of the invention have been illustrated and discussed, and provide a basis for practicing the invention in a variety of ways and in a variety of circuit structures. Numerous variations are possible within the scope of the invention. For example, the described antenna is not limited to use with an RFID tag. Also, the various embodiments illustrated are scalable to other operational frequencies. Features and elements associated with one or more of the described embodiments are not to be construed as required elements for all embodiments. The invention is limited only by the claims that follow.

What is claimed is:

1. A U-shaped antenna comprising:
   first and second conductive pads;
   a first slow wave conductor a electrical communication with the first conductive pad forming a first leg of the U-shaped antenna;
   a second slow wave conductor in electrical communication with the second conductive pad forming a second leg of the U-shaped antenna;
   where current flow through the first and second conductive pads is in a same direction such that the first and second conductive pad comprise primary radiating regions of the antenna; and
   a bridging conductor disposed between the first and the second slow wave conductors for completing the U-shaped antenna.

2. The antenna of claim 1 wherein a material of the first and the second slow wave conductors and a material of the first and the second conductive pads comprises conductive material further comprising one or more abrupt transitions formed therein.

3. The antenna of claim 1 wherein a effective aperture of the antenna is increased by the abrupt transitions.

4. The antenna of claim 1 wherein the first and the second conductive pads comprise a generally rectangular shape.

5. The antenna of claim 1 wherein the first and the second slow wave conductors comprise first and second meanderline transmission lines.

6. The antenna of claim 5 wherein each of the first and the second meanderline transmission lines comprises a plurality of undulating conductive segments, and wherein current flow in certain ones of the plurality of undulating segments of the first meanderline transmission line is in the same direction as current flow in certain ones of the plurality of undulating segments of the second meanderline transmission line.

7. The antenna of claim 6 wherein current flow in the plurality of undulating segments of the first and the second meanderline transmission lines comprises axial current flow in a direction of the first and the second legs of the U-shaped antenna or radial current flow perpendicular to the first and the second legs of the U-shaped antenna, and wherein the axial current flow produces a polarized signal in a first direction and the radial current flow produces a polarized signal in a second direction.

8. The antenna of claim 7 wherein current flow is in a same direction in the first and the second conductive pads.

9. The antenna of claim 1 wherein each one of the first and the second slow wave conductors exhibits an electrical length greater than a physical length.

10. An antenna comprising a slow wave section and a radiating section, wherein the slow wave section is located at or near a current minimum at or near a resonant frequency so as to reduce heating losses and improve radiation efficiency of the antenna and wherein the radiating section includes one or more conductive pads in which current flows in the same direction such that the one or more conductive pads comprise the primary radiating regions of the radiating section.

11. An antenna responsive to a transmitting/receiving component, comprising:
    first and second spaced-apart slow wave conductors each including first and second terminal ends thereof;
    first pad connected to the fin terminal end of the first slow wave conductor;
    a second pad connected to the first terminal end of the second slow wave conductor;
    wherein the transmitting/receiving component is electrically connected between the first and the second pads; and
    a conductive segment electrically connected between the first and the pads.

12. The antenna of claim 11 wherein the first and the second slow wave conductors are disposed in a substantially parallel orientation.

13. The antenna of claim 11 for transmitting and receiving electromagnetic energy, wherein current flow is in a substantially same direction in the first and the second pads, and wherein the first and the second pads comprise the primary radiating elements of the antenna.

14. The antenna of claim 11 further comprising a third pad connected to the second terminal end of the first slow wave conductor and a fourth pad connected to the second terminal end of the second slow wave conductor.

15. The antenna of claim 11 wherein the conductive segment is disposed in an electrically parallel relation to the transmitting/receiving component.

16. The antenna of claim 15 wherein an impedance of the transmitting/receiving component impedance includes a real component and a reactive component, and wherein the conductive segment transforms the real component to substantially match a real impedance of the antenna and substantially cancels the reactive component at or near an antenna operating frequency.

17. The antenna of claim 11 wherein the conductive segment provides a low impedance electrical path around the transmitting/receiving component for limiting electrostatic discharge into the transmitting/receiving component.

18. The antenna of claim 11 wherein the conductive segment and the transmitting/receiving component each exhibit an impedance, and wherein the electrical properties of the conductive segment are determined to substantially match the transmitting/receiving component impedance to the impedance seen by the transmitting/receiving component at or near an antenna operating frequency.

19. The antenna of claim 11 wherein the first and the second slow wave conductors and the first and second pads comprise one or more linear edges.

20. The antenna of claim 11 wherein the first and the second slow wave conductors and the first and second pads comprise abrupt structural transitions for increasing an effective antenna aperture.

21. The antenna of claim 11 wherein the first and second pads each comprise a rectangular shaped pad.

22. The antenna of claim 11 wherein the first slow wave conductor comprises a first meanderline transmission line and the second slow wave conductor comprises a second meanderline transmission line.

23. The antenna of claim 22 wherein each one of the first and the second meanderline transmission lines comprises a plurality of undulating conductive segments, and wherein current flow in certain ones of the plurality of undulating conductive segments of the first meanderline transmission line is in the same direction as current flow in certain ones of the plurality of undulating conductive segments of the second meanderline transmission line.

24. The antenna of claim 11 wherein the antenna comprises an electrical length greater than a physical length.

25. The antenna of claim 11 wherein the transmitting/receiving component is physically disposed between the first and the second pads.

26. An antenna having a resonant frequency and responsive to a transmitting/receiving component, comprising:
first and second spaced-apart slow wave conductors each including first and second terminal ends thereof, at least one of the first and the second slow wave conductors including a conductive tuning region disposed serially along a length thereof, the resonant frequency responsive to a current path length through the at least one of the first and the second slow wave conductors and further responsive to a change in current path length as determined by the conductive tuning region;
a first pad connected to the first terminal end of die first slow wave conductor;
a second pad connected to the first terminal end of the second slow wave conductor; and
wherein the transmitting/receiving component is electrically connected between the first and the second pads.

27. The antenna of claim 26 wherein the first and second slow wave conductors each further comprise undulating segments, and wherein the first slow wave conductor comprises a first conductive tuning region and the second slow wave conductor comprises a second conductive tuning region, and wherein the first and the second tuning regions are each disposed between two successive segments of the first slow wave conductor, and wherein the second conductive tuning region is disposed between two successive segments of the second slow wave conductor.

28. The antenna of claim 26 wherein the first and second slow wave conductors each further comprise undulating segments and wherein the first slow wave conductor comprises a first conductive tuning region and the second slow wave conductor comprises a second conductive tuning region, arid wherein the first conductive tuning region is disposed between the first pad and an adjacent undulating segment of the first slow wave conductor, and wherein the second conductive tuning region is disposed between the second pad and an adjacent undulating segment of the second slow wave conductor.

29. The antenna of claim 26 further comprising a third pad connected to the first terminal end of the first slow wave conductor and a fourth pad connected to the first terminal end of the second slow wave conductor, and wherein the first and second slow wave conductors each further comprising undulating segments, and wherein the first slow wave conductor comprises a first conductive tuning region disposed between the third pad and an adjacent undulating segment of the first slow wave conductor, and wherein the second slow wave conductor comprises a second conductive tuning region disposed between the fourth pad and an adjacent undulating segment of the second slow wave conductor.

30. An antenna comprising:
a conductive sheet having a plurality of shaped openings formed therein, wherein the openings form first and second parallel spaced-apart meanderline transmission lines, first and second apertures disposed at first terminal ends of the first and the second meanderline transmission lines, respectively, and third sad fourth apertures disposed at second terminal end of the first and the second meanderline transmission line, respectively, and a bridging opening connecting the first and the second apertures.

* * * * *